(12) United States Patent
Moon (10) Patent No.: US 10,889,303 B2
(45) Date of Patent: Jan. 12, 2021

(54) APPARATUS AND METHOD FOR CONTROLLING DRIVING OF A VEHICLE, AND A VEHICLE SYSTEM

(71) Applicants: HYUNDAI MOTOR COMPANY, Seoul (KR); KIA MOTORS CORPORATION, Seoul (KR)

(72) Inventor: Byoung Youp Moon, Gwangju (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/571,831

(22) Filed: Sep. 16, 2019

(65) Prior Publication Data

US 2020/0189613 A1  Jun. 18, 2020

(30) Foreign Application Priority Data

Dec. 12, 2018  (KR) .................. 10-2018-0159729

(51) Int. Cl.
| | |
|---|---|
| *B60W 50/12* | (2012.01) |
| *B60W 40/08* | (2012.01) |
| *B60W 50/14* | (2020.01) |
| *B60H 1/00* | (2006.01) |

(52) U.S. Cl.
CPC ......... *B60W 50/12* (2013.01); *B60H 1/00764* (2013.01); *B60W 40/08* (2013.01); *B60W 50/14* (2013.01); *B60W 2040/0818* (2013.01); *B60W 2520/06* (2013.01); *B60W 2540/12* (2013.01); *B60W 2552/00* (2020.02); *B60W 2556/45* (2020.02)

(58) Field of Classification Search
CPC ...... B60W 50/12; B60W 40/08; B60W 50/14; B60H 1/00764
USPC ........................................................ 340/439
See application file for complete search history.

(56) References Cited

U.S. PATENT DOCUMENTS

| | | | |
|---|---|---|---|
| 7,138,922 B2 * | 11/2006 | Strumolo | G08B 21/06 340/575 |
| 9,878,663 B1 * | 1/2018 | Kochura | B60W 50/0098 |
| 2012/0078509 A1 * | 3/2012 | Choi | G01C 21/3415 701/423 |
| 2015/0239477 A1 * | 8/2015 | Kitagawa | G01C 21/3407 701/1 |
| 2016/0052391 A1 * | 2/2016 | Walsh | B60K 28/066 340/575 |
| 2017/0235305 A1 * | 8/2017 | Jung | B60W 50/082 701/23 |
| 2017/0369075 A1 * | 12/2017 | Hwang | B60W 40/08 |
| 2018/0244279 A1 * | 8/2018 | Kochhar | A61B 5/0496 |
| 2018/0349711 A1 * | 12/2018 | Prasad | G01S 15/86 |
| 2019/0011918 A1 * | 1/2019 | Son | G01C 21/3484 |

* cited by examiner

*Primary Examiner* — Kerri L McNally
(74) *Attorney, Agent, or Firm* — Lempia Summerfield Katz LLC (57) ABSTRACT

An apparatus, a method, and a system are configured for controlling driving of a vehicle. The apparatus for controlling driving of a vehicle includes a determination device that determines whether a driver is in an inattentive driving state during driving. The apparatus also includes a controller that switches a driving mode of the vehicle into a rest mode when it is determined that the driver is in the inattentive driving state. The controller also controls the vehicle to enter a rest area when the vehicle reaches the rest area on a traveling path of the vehicle.

19 Claims, 10 Drawing Sheets

APPARATUS AND METHOD FOR CONTROLLING DRIVING OF A VEHICLE, AND A VEHICLE SYSTEM

CROSS-REFERENCE TO RELATED APPLICATION

This application claims the benefit of priority to Korean Patent Application No. 10-2018-0159729, filed in the Korean Intellectual Property Office on Dec. 12, 2018, the entire contents of which are incorporated herein by reference.

TECHNICAL FIELD

The present disclosure relates to a apparatus and a method for controlling driving of a vehicle, and a vehicle system, and more particularly, to a technique applied to a commercial vehicle such as a large truck.

BACKGROUND

Generally, the risk of accidents in commercial vehicles, such as large trucks, increases as the shaft load, i.e., axle load, which varies depending on the weight of the loaded cargo, increases.

An accident caused by such a large truck may lead to a large-scale accident. As a result, government regulations state that the shaft load must not exceed a specified value.

In addition, because inattentive driving by a driver of a commercial vehicle may lead to a large-scale accident, when the inattentive state is detected by identifying an inattentive state of a driver through a driver inattention warning system, an alarm may be triggered. Therefore, the alarm gains the attention of the driver and the driver may decide to take a break.

However, because the conventional inattention warning system only outputs a warning alarm to a driver, when the driver ignores the warning alarm and continues driving, it may be difficult for the system to prevent an accident from occurring.

SUMMARY

The present disclosure has been made to solve the above-motioned problems occurring in the prior art while advantages achieved by the prior art are maintained intact.

An aspect of the present disclosure provides an apparatus and a method for controlling driving of a vehicle, which are capable of entering a rest mode when it is detected that the driver of a commercial vehicle is in an inattentive driving state. When it is determined that the driver is inattentive, a driving control is performed such that the commercial vehicle automatically enters a rest area when the commercial vehicle reaches a location of the next rest area, thereby preventing 1o an accident in advance.

Another aspect of the present disclosure provides an apparatus and a method for controlling driving of a vehicle, which are capable of monitoring a road condition in real time. The apparatus ad method are also capable of adjusting an alarm time according to the road condition when the alarm schedule is registered in a server, in response to a driver request, when the vehicle is in an ignition-off state and in the state of entering a rest mode, so that the convenience of the driver is improved.

Still another aspect of the present disclosure provides an apparatus and a method for controlling driving of a vehicle, which are capable of creating a pleasant rest environment by regulating the room or cab temperature based on the external temperature when the vehicle is in the rest mode. Thereby, the satisfaction of the driver is improved.

The technical problems to be solved by the present inventive concept are not limited to the aforementioned problems. Any other technical problems not mentioned herein may be dearly understood from the following description by those of ordinary skill in the art to which the present disclosure pertains.

According to an aspect of the present disclosure, an apparatus for controlling driving of a vehicle includes a determination device that determines whether a driver is in an inattentive driving state during driving. The apparatus further includes a controller that switches a driving mode of the vehicle into a rest mode when it is determined that the driver is in the inattentive driving state. The controller further controls the vehicle to enter a rest area when the vehicle reaches the rest area along a traveling path of the vehicle.

The determination device may collect driving state information of the vehicle during the driving and determine the inattentive driving state based on the collected driving state information.

The driving state information may include at least one of a brake pedal depressed state, a lane tracking state, a lane changing state, a lane departure state, and a steering state of the vehicle.

When the driving mode of the vehicle is switched to the rest mode, the controller may output a warning message to induce safety driving before reaching a specified distance from the rest area on the traveling path of the vehicle.

When the driving mode of the vehicle is switched to the rest mode and the vehicle reaches a specified distance from the rest area on the traveling path of the vehicle, the controller may output a guide message to induce the vehicle to enter the rest area.

The controller may limit a driving speed and a lane change of the vehicle while the vehicle is induced to enter the rest area.

When the vehicle enters the rest area and completes parking, the controller may output a control signal corresponding to an external temperature to control an indoor temperature of the vehicle.

When alarm information is input from the driver when the vehicle enters the rest area and parking is completed, the controller may access a server connected in wireless communication to register the alarm information and switch to a standby mode.

The controller may release the standby mode and output an alarm signal when receiving an event signal from the server.

The controller may output a first alarm signal when receiving the event signal from the server and output a second alarm signal when the rest mode is not released after a specified time has elapsed.

The apparatus may further include an alarm device that outputs an alarm sound corresponding to the first alarm signal and a warning sound corresponding to the second alarm signal.

The apparatus may further include an indoor lamp that is tuned on in response to the alarm signal.

According to another aspect of the present disclosure, a method of controlling driving of a vehicle includes determining whether a driver is in an inattentive driving state during driving. The method further includes switching a driving mode of the vehicle into a rest mode when it is determined that the driver is in the inattentive driving state. The method further includes controlling the vehicle to enter a rest area when the vehicle reaches the rest area along a traveling path.

According to still another aspect of the present disclosure, a vehicle system includes a driving control apparatus that switches a driving mode of a vehicle into a rest mode when a driver is determined to be in an inattentive driving state during driving. The driving control apparatus further controls the vehicle to enter a rest area when the vehicle reaches the rest area along a traveling path of the vehicle. The vehicle system further includes a server that registers alarm information when receiving the alarm information from the driving control apparatus in a state where the vehicle enters the rest area and parking is completed. The server further transmits an event signal to the driving control apparatus to inform a rest mode termination situation when a registered alarm time has elapsed.

BRIEF DESCRIPTION OF THE DRAWINGS

The above and other objects, features ad advantages of the present disclosure will be more apparent from the following detailed description taken in conjunction with the accompanying drawings.

DETAILED DESCRIPTION

Hereinafter, some embodiments of the present disclosure are described in detail with reference to the various drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, term such as first, second, "A", "B", (a), (b), and the like may be used. These terms are merely intended to distinguish one component from another component, and the term do not limit the nature, sequence or order of the constituent components. Unless otherwise defined, all terms used herein, including technical or scientific terms, have the same meanings as those generally understood by those of ordinary skill in the art to which the present disclosure pertains. Such terms as those defined in a generally used dictionary are to be interpreted as having meanings equal to the contextual meanings in the relevant field of art Such term are not to be interpreted as having ideal or excessively formal meanings unless dearly defined as having such in the present application.

The present disclosure relates to an apparatus and a method for controlling driving of a vehicle and may be applied to a commercial vehicle such as a large truck.

Figure 1:
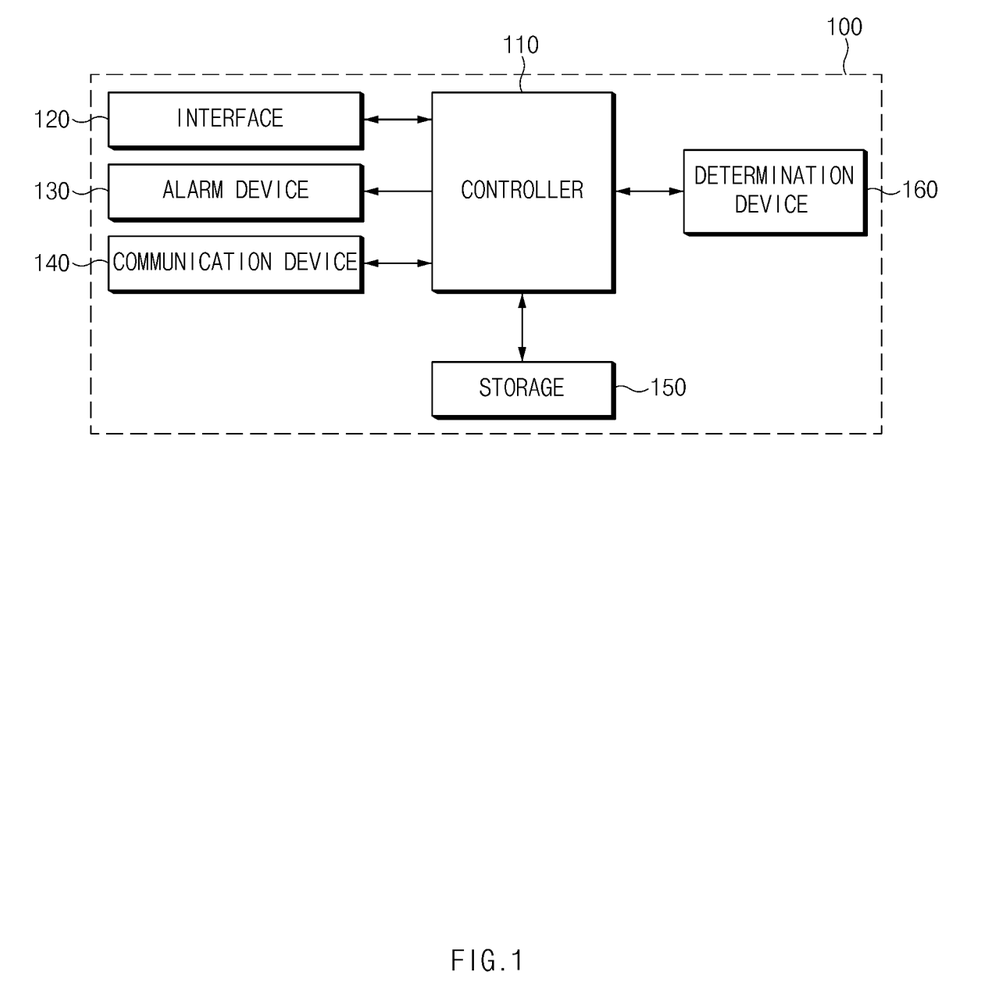
FIG. 1 is a block diagram illustrating a configuration of an apparatus for controlling driving of a vehicle according to an embodiment of the present disclosure.

FIG. 1 is a block diagram illustrating a configuration of an apparatus for controlling driving of a vehicle according to an embodiment of the present disclosure. An apparatus 100 for controlling driving of a vehicle according to the present disclosure may be implemented in a vehicle. In this case, the apparatus 100 for controlling driving of a vehicle may be formed integrally with internal controllers of the vehicle or may be implemented as a separate apparatus and connected to the controllers of the vehicle through separate connecting means. In this case, the apparatus 100 may operate in connection with an engine and a motor of the vehicle. The apparatus 100 may operate in connection with a controller that controls the operation of the engine or motor.

Referring to FIG. 1, the apparatus 100 for controlling driving of a vehicle may include a controller 110, an interface 120, an alarm device 130, a communication device 140, storage 150, and a determination device 160. The controller 110 and/or the determination device 160 of the apparatus 100 according to the present disclosure may be implemented as at least one or more processors. In this case, the controller 110 may process signals transmitted between respective components of the apparatus 100 for controlling driving of a vehicle.

The interface 120 may include input means for receiving a control command from a driver and output means for outputting an operation state and a result of the apparatus 100.

In this case, the input means may include a key button, a mouse, a joystick, a jog shuttle, a stylus pen, and the like. In addition, the input means may include a soft key implemented on a display.

The output means may include a display. In this case, when a touch sensor such as a touch film, a touch sheet, a touch pad, or the like is provided on the display, the display may operate as a touch screen, and the input and output means may be implemented integrated with each other.

In this case, the display may include at least one of a liquid crystal display (LCD), a thin film transistor liquid crystal display (TFT LCD), an organic light-emitting diode (OLED), a flexible display, a field emission display (FED), and a three-dimensional (3D) display.

The alarm device 130 is means for outputting an alarm corresponding to a control signal from the controller 110 when an alarm time elapses in a state where the vehicle is in a rest mode. As one example, the alarm device 130 may include a buzzer, a horn, or the like. In addition, the alarm device 130 may further include a lamp installed inside of the vehicle.

The communication device 140 may include a communication module that supports communication interfaces with sensors, electrical components, and/or controllers provided in the vehicle.

In an example, the communication module may receive driving information of the vehicle from the sensors and/or the controllers provided in the vehicle. In this case, the driving information of the vehicle may include at least one of pressure information of a brake pedal of the vehicle, lane tracking information, lane changing information, lane departure information, and/or steering information.

In addition, the communication module may receive vehicle location information, destination information, arrival estimated time information, and the like from a navigation system.

In this case, the communication module may include a module for supporting vehicle network communication such as controller area network (CAN) communication, local interconnect network (LIN) communication, flex-ray communication, or the like.

In addition, the communication device 140 may include a communication module that supports communication interface with the server. In an example, the communication module may include a module for wireless Internet access or a module for short range communication.

In this case, wireless Internet technology may include wireless LAN (WLAN), wireless broadband (WIBRO), Wi-Fi, or world interoperability for microwave access (WiMAX), and short-range communication technology may include Bluetooth, ZigBee, ultra-wideband (UWB), radio frequency identification (RFID), infrared data association (IrDA), or the like.

The storage 150 may store data and/or algorithms required for an operation of the apparatus 100 for controlling driving of a vehicle.

In an example, the storage 150 may store the driving information of the vehicle received through the communication device 140 and information received from the navigation system. In addition, the storage 150 may store condition information for determining an inattentive driving state of the driver and an algorithm for determining the inattentive driving state. In addition, the storage 150 may store alarm information input from the driver. The storage 150 may also store a command and/or an algorithm for performing an operation of changing an alarm condition according to a road condition or outputting an alarm when an alarm time has elapsed.

In this case, the storage 150 may include a storage medium such as a random access memory (RAM), a static random access memory (SRAM), a read-only memory (ROM), a programmable read-only memory (PROM), an electrically erasable programmable read-only memory (EEPROM), and the like.

The determination device 160 determines whether the driver is in an inattentive driving state while driving the vehicle. In this case, the determination device 160 may determine whether the driving information of the vehicle meets a preset condition. The determination device 160 may determine that the driver is in an inattentive driving state when the preset condition is met. An embodiment of this is described with reference to FIG. 2 below.

Figure 2:
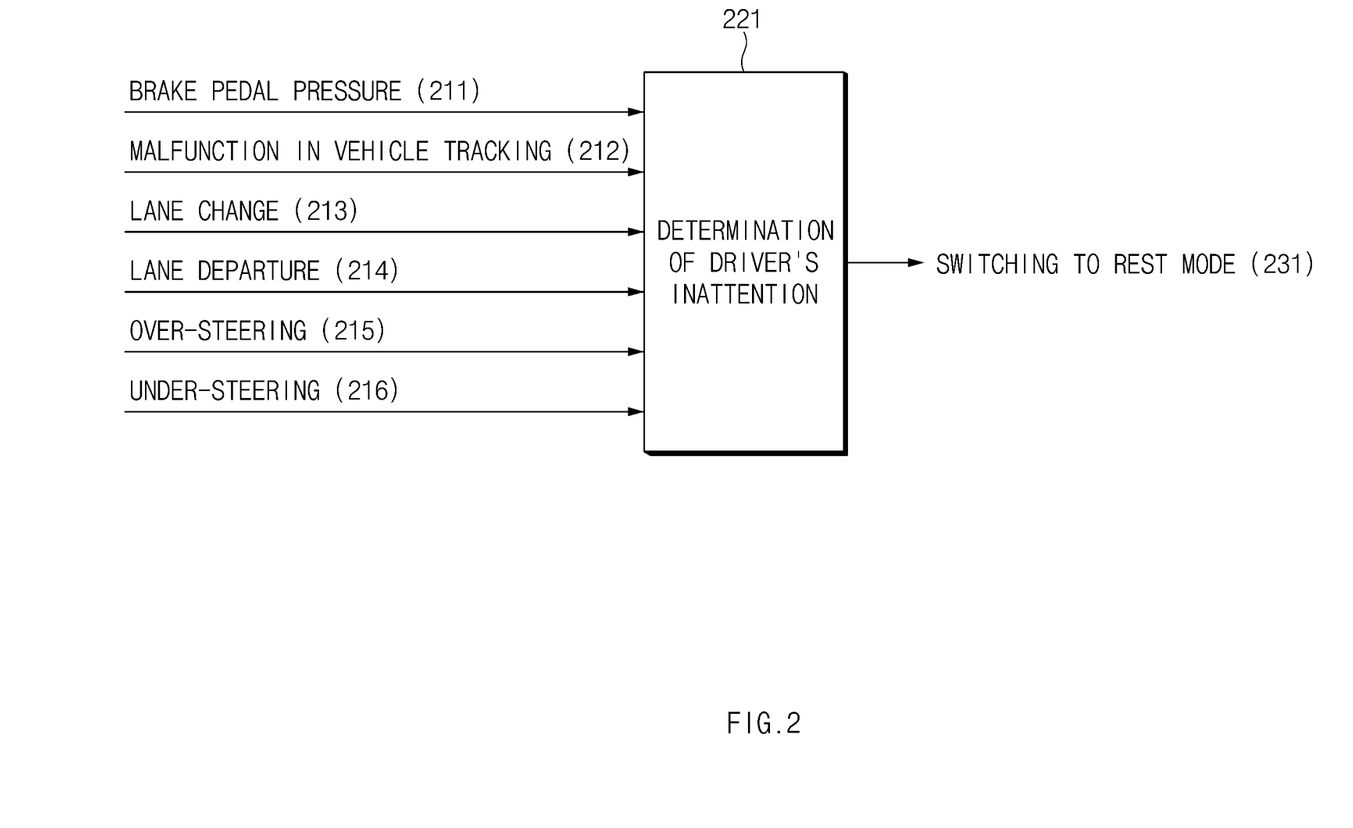
FIGS. 2 and 3 are diagrams illustrating an operation of an apparatus for controlling driving of a vehicle according to an embodiment of the present disclosure.

As shown in FIG. 2, the determination device 160 determines whether a brake pedal pressing condition 211, a lane-tracking abnormal condition 212, a lane changing condition 213, a lane departure condition 214, an over-steering condition 215 and/or an under-steering condition 216 areas met.

When the driver is in an inattentive driving state, the driver may irregularly press the brake pedal or suddenly press the brake pedal over a certain amount of pressure. Accordingly, in operation 221, the determination device 160 may determine the inattentive driving state of the driver based on the brake pedal pressing condition 211 of the driver.

In addition, when the driver is in an inattentive driving state, the vehicle may not run in a straight line in the lane but may run in an irregular manner in the lateral direction or may leave the lane to be moved to a side lane. However, when the driver changes the lane in an inattentive driving state, the lane changing time may become longer than in an attentive driving state, or the lane may be changed irregularly and continuously. Therefore, in operation 221, the determination device 160 may determine the inattentive driving state of the driver based on the lane tracking abnormal condition 212, the lane changing condition 213, and/or the lane departure condition 214.

In addition, when the driver is in an inattentive driving state, the driver may over-steer the steering wheel or under-steer on a curved road. Therefore, in operation 221, the determination device 160 may determine the inattentive driving state of the driver based on the over-steering condition 215 and/or the under-steering condition 216.

In this case, the detailed condition value of each condition for determining the inattentive driving state may vary with an axle load of the vehicle.

In this case, when all of the preset conditions 211 to 216 are met or the specified number of conditions or more are met, the determination device 160 may determine that the driver is in an inattentive driving state.

Of course, the conditions mentioned in FIG. 2 are only proposed as an embodiment, and the embodiments are not limited thereto. It can be understood that any conditions that may determine the inattentive driving state of the driver are applicable.

The determination device 160 may further determine whether a physical abnormal state of the vehicle is detected based on an air pressure condition of the vehicle. As an example, the determination device 160 may further determine whether the tire air pressure of the vehicle is less than a reference air pressure.

When it is determined that the driver is in the inattentive driving state, the determination device 160 may transmit the determination result to the controller 110.

When the determination device 160 determines that the driver is in the inattentive driving state, in operation 231, the controller 110 switches the driving mode of the vehicle to the rest mode.

Figure 3:
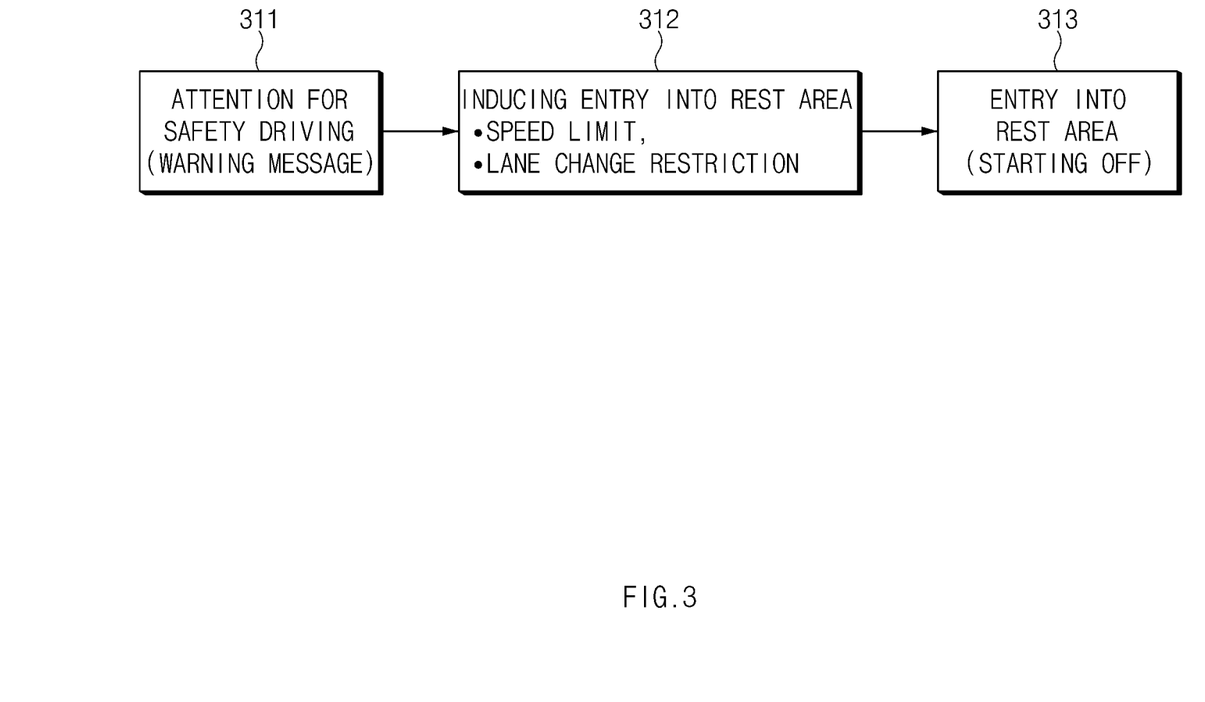

When the driving mode of the vehicle is switched to the rest mode, the controller 110 sequentially performs the operations of FIG. 3 and induces the driver to take a rest.

As shown in FIG. 3, in first operation 311, the controller 110 identifies the location of a next rest area from the navigation system and outputs a warning message to the display until the vehicle reaches the next rest area, thereby giving the driver attention to ensure safety driving.

In second operation 312, the controller 110 induces the vehicle to enter the next rest area when the vehicle approaches the location of the next rest area. In this case, the controller 110 may restrict the driving speed and the lane change of the vehicle, thereby preventing the driver from attempting to pass the rest area.

Thereafter, in third operation 313, the controller 110 allows the vehicle to enter the rest area when the vehicle reaches the location of the rest area. In this case, in order to prevent the driver from arbitrarily starting the vehicle, the controller 110 may release the rest mode only when the specified conditions, i.e., the door of the vehicle is opened when the ignition of the vehicle is off and the like are met.

When alarm information is input from the driver after the vehicle enters the rest area, the controller 110 may register the input alarm information and output a control signal to the alarm device 130 when the registered alarm time elapses. In this case, the alarm information may be information input through a hands-free microphone of the driver connected to a vehicle network. The alarm information may be information input through input means of the interface 120.

The controller 110 may output a first alarm signal to the alarm device 130 when the alarm time elapses. Accordingly, the alarm device 130 may output an alarm corresponding to the first alarm signal. As an example, the alarm device 130 may output an alarm sound through a buzzer corresponding to the first alarm signal and may turn on an indoor light.

When the rest mode is not terminated by the driver after the first alarm signal is output to the alarm device 130, the controller 110 may output a second alarm signal to the alarm device 130. Accordingly, the alarm device 130 may output an alarm corresponding to the second alarm signal. As an example, the alarm device 130 may output an alarm sound through a horn corresponding to the second alarm signal.

The controller 110 may control the operation of an air conditioner, a heater, and/or a seat heating wire based on an outside temperature such that the driver may rest in a comfortable environment after the vehicle enters the rest area. In an example, the controller 110 may control the operation of the air conditioner when the outside temperature exceeds an upper limit temperature during the summer season. In addition, the controller 110 may control the operation (non-startup) of the heater and/or the seat heating wire when the outside temperature is lower than a lower limit temperature in winter.

Figure 4:
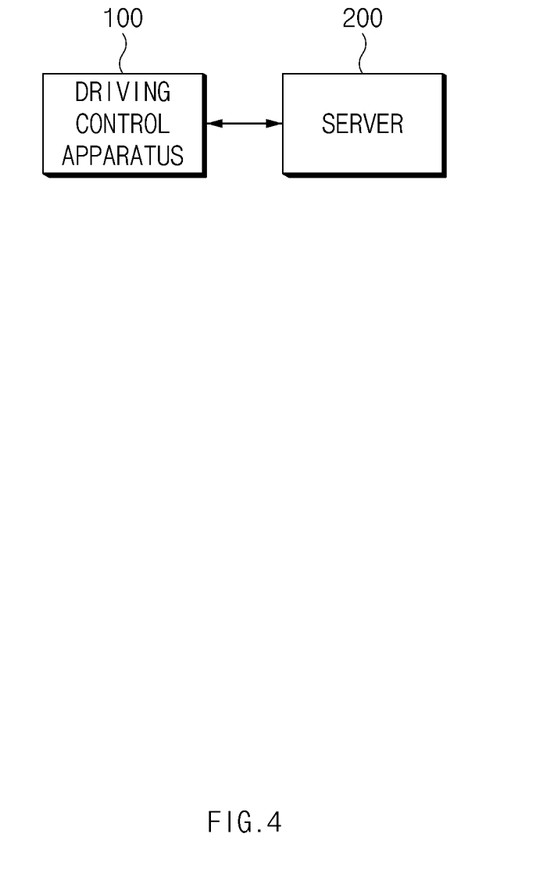
FIG. 4 is a block diagram illustrating a vehicle system to which an apparatus for controlling driving of a vehicle according to an embodiment of the present disclosure is applied.

The apparatus 100 for controlling driving of a vehicle may perform an alarm in the rest mode through an interworking operation with the server connected through Internet. The configuration of a vehicle system to which the apparatus 100 for controlling driving of a vehicle and the server are applied is shown in FIG. 4. Referring to FIG. 4, the vehicle system may include the driving control apparatus 100 and a server 200.

The driving control apparatus 100 may include all of the components and functions described above. In addition, when the alarm information is input from the driver after the vehicle enters the rest area, the controller 110 of the driving control apparatus 100 may access the server 200 interworking with the driving control apparatus 100 to register the alarm information.

The server 200 may be connected to the driving control apparatus 100 through wireless communication and transmit/receive signals in real time. In this case, when the registered alarm time has elapsed, the server 200 may transmit an event signal to the communication device 140 of the driving control apparatus 100.

In this case, the controller 110 of the driving control apparatus 100 may operate in the standby mode until the event signal is received from the server 200.

The server 200 may also perform ignition-on control through remote control when the controller 110 of the driving control apparatus 100 operates in the standby mode.

An example of the operation between the driving control apparatus 100 and the server 200 is described below with reference to FIG. 5.

Figure 5:
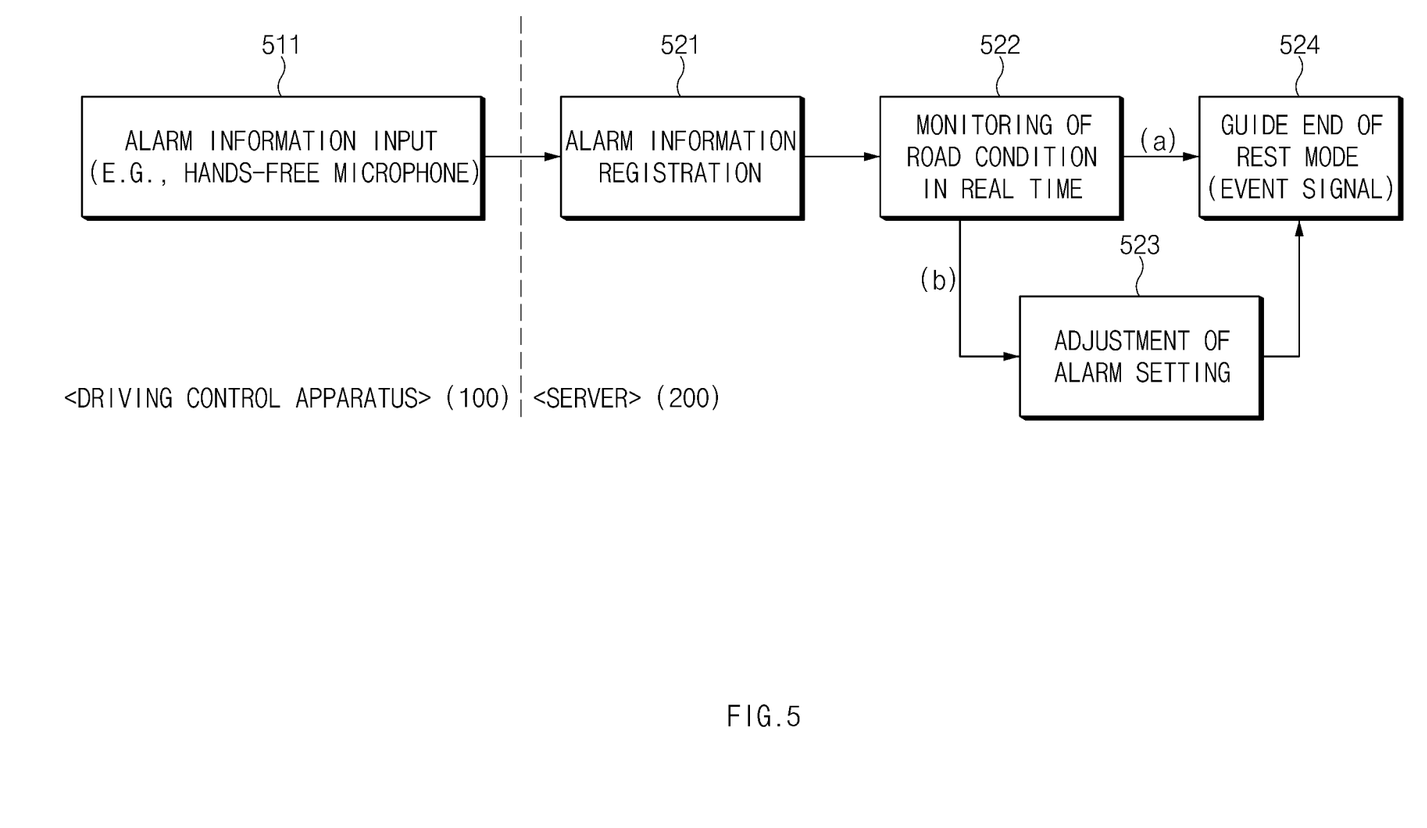
FIG. 5 is a diagram illustrating a operation of a vehicle system according to an embodiment of the present disclosure.

As shown in FIG. 5, when the alarm information is inputted through the hands-free microphone or the like connected to the vehicle network from the driver in operation 511, the controller 110 of the driving control apparatus 100 accesses the server 200 to register the alarm information input from the driver. In this case, the controller 110 may register destination information of the vehicle, a driving schedule, and the like together.

When the alarm information is registered by the controller 110 of the driving control apparatus 100 in operation 521, the server 200 may monitor the road condition in real time based on the destination information and/or the driving schedule in operation 522.

When the traffic condition on the road, i.e., the road condition is a smooth or uncongested traffic state, the server 200 enters the condition (a). Thereafter, when the alarm time has elapsed, in operation 524, the server 200 may transmit an event signal to the driving control apparatus 100, thereby informing of the end of the rest mode.

Meanwhile, when the road condition is a congested state, the server 200 enters the condition (b). Thereafter, in operation 523, the server 200 may adjust the alarm set time by comparing an initially set remaining time with a destination arrival time based on to the road condition. In this case, in operation 524, the server 200 may inform of the end of the rest mode by transmitting an event signal to the driving control apparatus 100 after the adjusted alarm time elapses.

Therefore, when the controller 110 of the driving control apparatus 100 receives the event signal from the server 200, the controller 110 may release the standby mode and output an alarm based on the event signal.

When the event signal is received from the server 200, the controller 110 may output the first or second alarm signal to the alarm device 130. Thus, the alarm device 130 may output an alarm corresponding to the first or second alarm signal.

The driving control apparatus 100 and/or the server 200 according to an embodiment which operate(s) as described above, may be implemented in a form of an independent hardware device including a memory and a processor for processing each operation. The driving control apparatus 100 and/or the server 200 may be operated in a form included in another hardware device such as a microprocessor or a general-purpose computer system.

The operation of the vehicle system according to an embodiment of the present disclosure is described below in more detail as follows.

Figure 6:
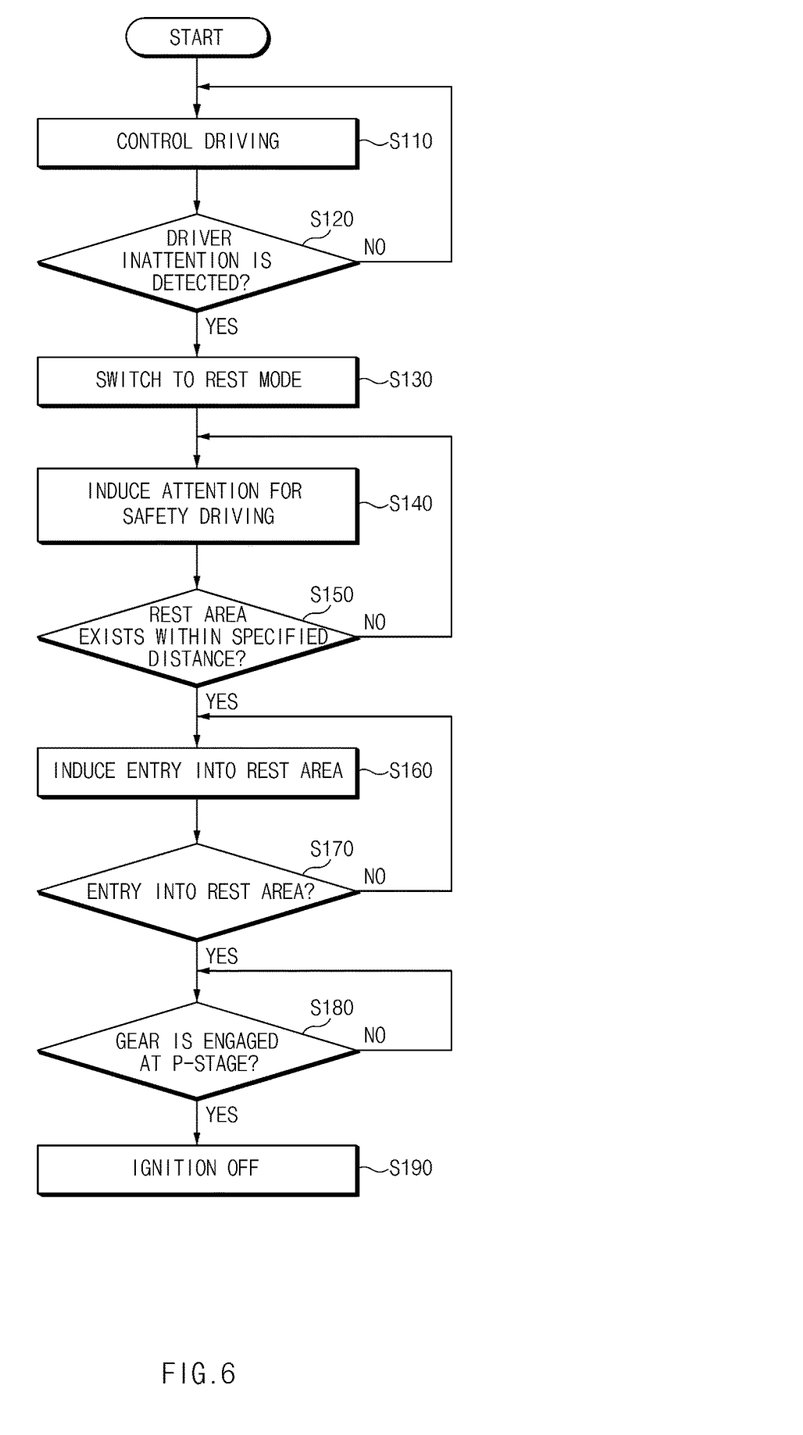
FIG. 6 is a flowchart illustrating a method of controlling driving of a vehicle according to an embodiment of the present disclosure.

FIG. 6 is a flowchart illustrating a method of controlling driving of a vehicle according to an embodiment of the present disclosure.

Referring to FIG. 6, in operations S110 and S120, the driving control apparatus 100 determines whether an inattentive state of the driver is detected while the vehicle is traveling. When the inattentive state of the driver is detected, in operation S130, the driving control apparatus 100 switches the driving mode of the vehicle to the rest mode.

Thereafter, in operation S140, the driving control apparatus 100 outputs a warning message to induce the driver to pay attention to safety driving. When it is identified in operation S150 that there is a rest area within a certain distance from the vehicle, the driving control apparatus 100 performs speed limit and lane change restriction to induce the vehicle to enter the rest area in operation S160.

When the vehicle enters a rest area in operation 170 and the gear stage is engaged at the P-stage, i.e. the transmission is in park mode, in operation S180, the driving control apparatus 100 may turn off ignition of the vehicle in operation S190.

After operation S190, alarm information may be input to the driving control apparatus 100 by the driver. In this case, the driving control apparatus 100 may register the alarm information input by the driver in the server 200 and enter the standby mode. An embodiment of this is described below with reference to the flowchart of FIG. 7.

Figure 7:
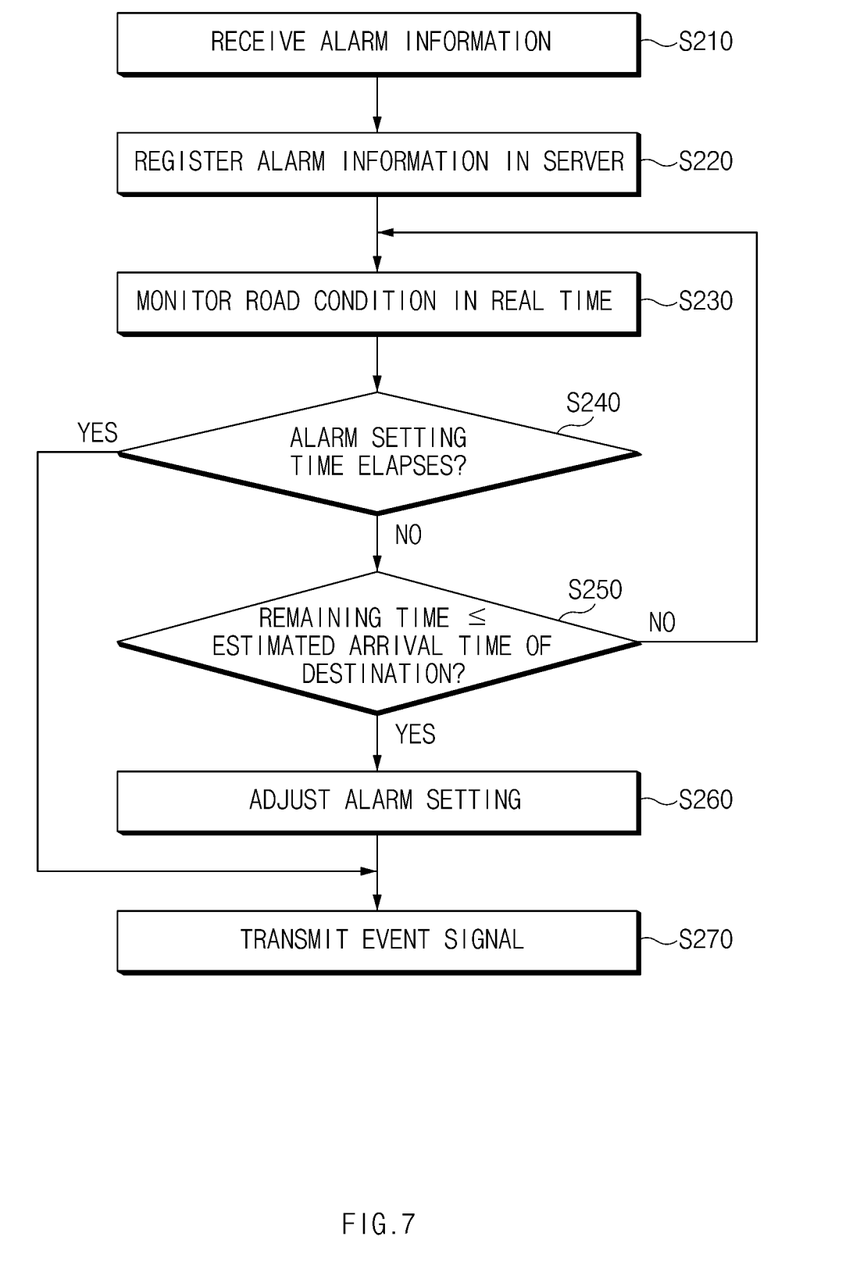
FIG. 7 is a flowchart illustrating an operation of a server according to an embodiment of the present disclosure.

FIG. 7 is a flowchart illustrating an operation of a server according to an embodiment of the present disclosure.

Referring to FIG. 7, when the alarm information is received from the driving control apparatus 100 in operation S210, the server 200 registers the alarm information in operation S220. Thereafter, in operation S230, the server 200 may monitor the road condition in real time until the alarm time registered in operation S220 elapses.

When the set alarm time has elapsed in operation S240 or the estimated arrival time of the destination is longer than the remaining time to the completion of the travel due to deterioration of the road condition in operation S250, the server 200 transmits an event signal to the driving control apparatus 100 in operation S270.

Therefore, the driving control apparatus 100 may be released from the standby mode by the event signal of operation S270.

The driving control apparatus 100 outputs an alarm when the event signal is received to from the server 200. An embodiment of this is described below with reference to FIG. 8.

Figure 8:
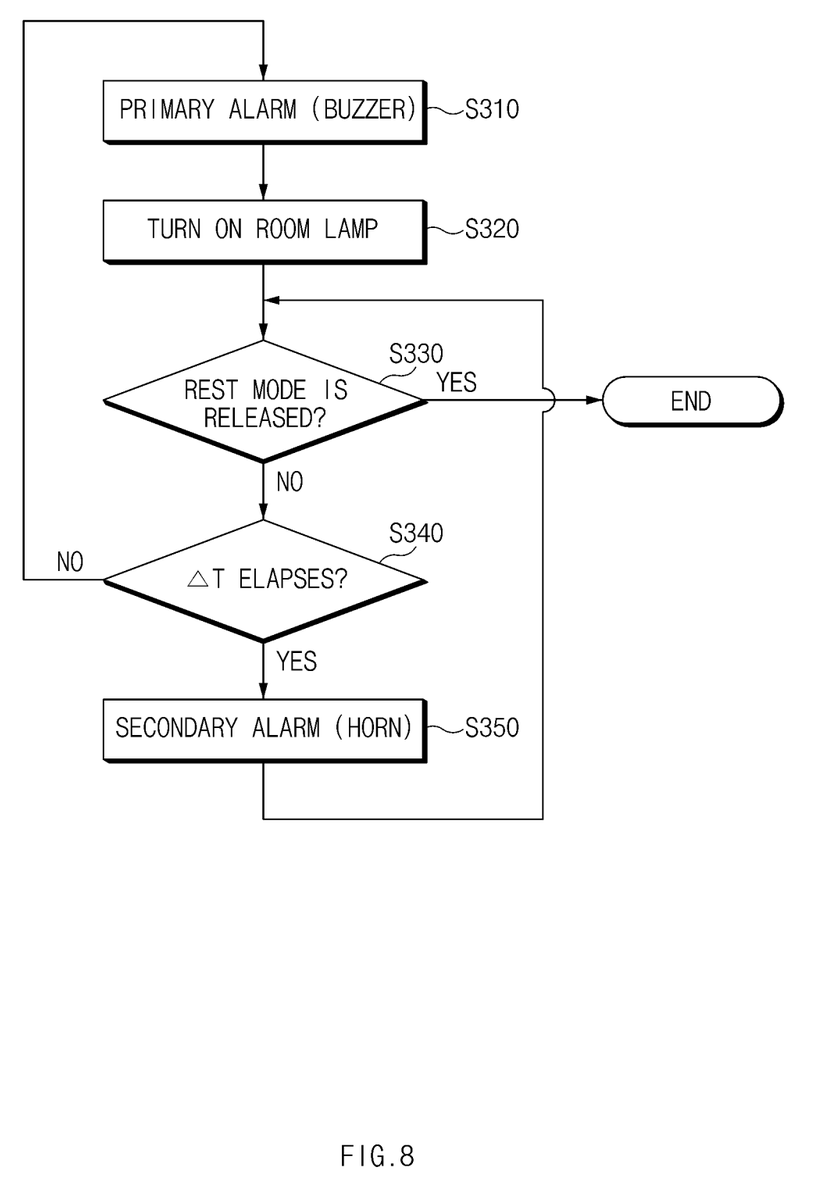
FIG. 8 is a flowchart illustrating a alarm operation of an apparatus for controlling driving of a vehicle according to an embodiment of the present disclosure.

FIG. 8 is a flowchart illustrating an alarm operation of an apparatus for controlling driving of a vehicle according to an embodiment of the present disclosure.

Referring to FIG. 8, when the event signal is received, in operation S310, the driving control apparatus 100 may output a primary alarm through the alarm output means provided in the interior of the vehicle interior. For example, the driving control apparatus 100 may output an alarm sound through a buzzer.

In operation S320, the driving control apparatus 100 may turn on the interior lamp while outputting a first alarm sound through the buzzer.

Thereafter, when the rest mode is terminated (or released) by the drivers manual operation in operation S330, the driving control apparatus 100 ends the related operation.

In this case, the driving control apparatus 100 may repeat operations S310 and S320 to output the primary alarm until the rest mode is terminated (or released) by the driver's manual operation.

When the rest mode is not terminated (or released) by the driver in operations S330 and S340 until a specified time elapses after operation S320, the driving control apparatus 100 may output a secondary alarm through second alarm means in operation S350. As an example, the driving control apparatus 100 may output the alarm sound through the horn of the vehicle. Thereafter, the driving control apparatus 100 ends the related operation when the rest mode is terminated (or released) by the driver's manual operation in operation S330.

Figure 9:
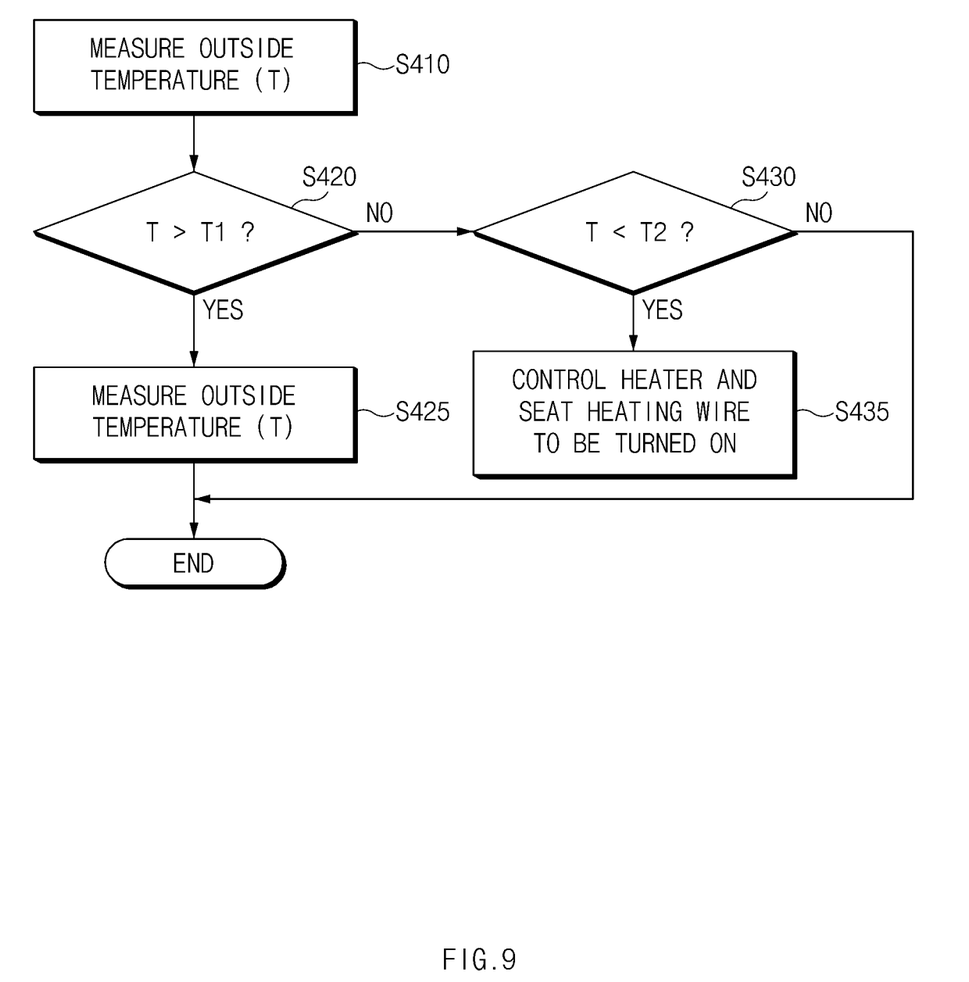
FIG. 9 is a flowchart illustrating an air conditioning operation of an apparatus for controlling driving of a vehicle according to an embodiment of the present disclosure.

FIG. 9 is a flowchart illustrating an air conditioning operation of an apparatus for controlling driving of a vehicle according to an embodiment of the present disclosure.

Referring to FIG. 9, the driving control apparatus 100 may measure an external temperature T to allow the driver to take a rest in a pleasant environment in operation S410. The driving control apparatus 100 may control the air conditioner, the heater and/or the seat heating to wire based on the measured external temperature T.

For example, when the external temperature T measured in operation S410 exceeds an upper limit temperature T1, in operation S425, the driving control apparatus 100 may control the air conditioner to be turned on such that the indoor, interior, or cab temperature is prevented from rising above a specified temperature.

When the external temperature T measured in operation S410 is less than a lower limit temperature 12 in operation S430, in operation S435, the driving control apparatus 100 may control the heater and the seat heating wire to be turned on such that the indoor, interior, or cab temperature is prevented from falling below a specified temperature.

When the external temperature T is maintained between the upper limit temperature T1 and the lower limit temperature T2, the driving control apparatus 100 may not control the operations of the air conditioner, the heater, and/or the seat heating wire.

As described above, according to the apparatus 100, the method for controlling driving of a vehicle, and the vehicle system according to the present disclosure, when the driver of a commercial vehicle is in an inattentive driving state, it is possible to prevent an accident in advance by forcibly allowing the driver to rest. In addition, it is possible to increase the convenience of the driver by providing the alarm service based on the road condition while the driver is resting.

Figure 10:
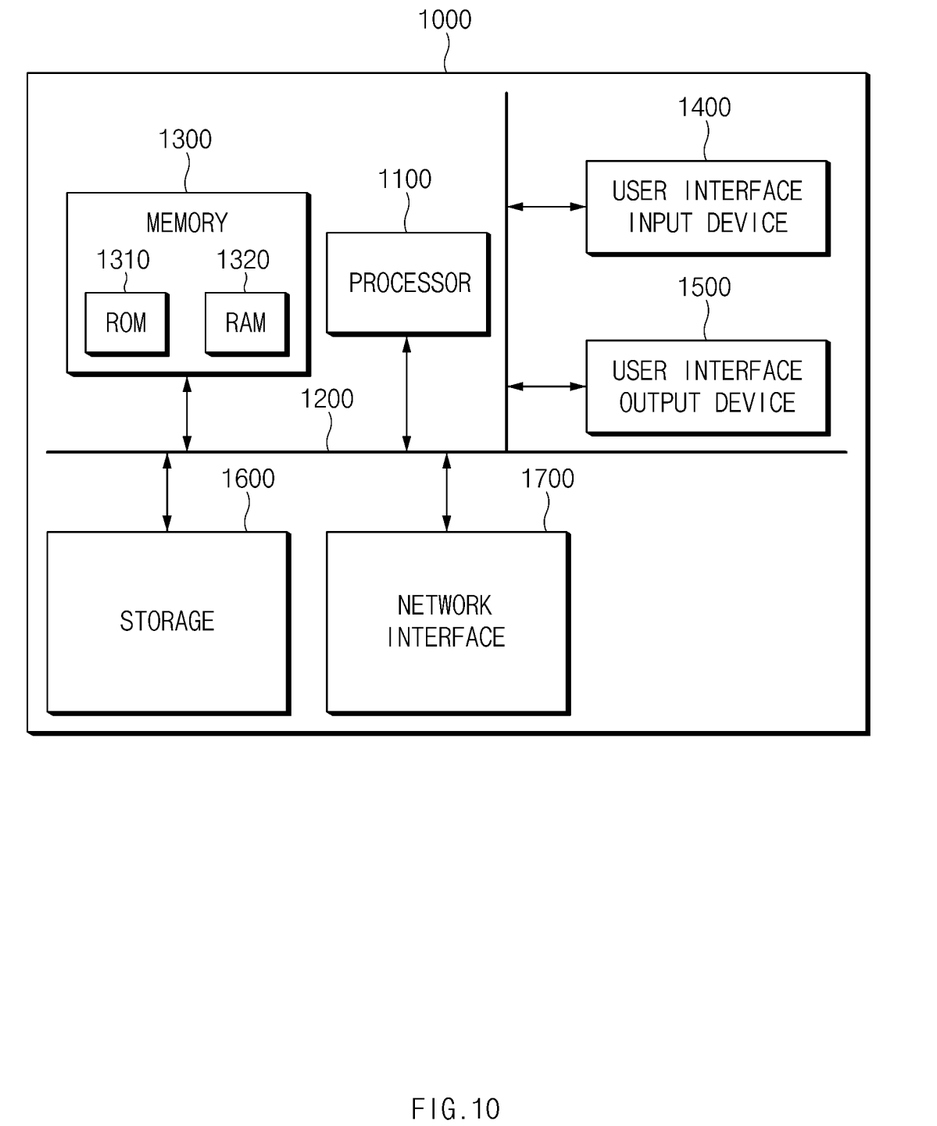
FIG. 10 is a view illustrating a computing system by which a method according to an embodiment of the present disclosure is executed.

FIG. 10 illustrates a computing system by which a method according to an embodiment of the present disclosure is executed.

Referring to FIG. 10, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM. The storage medium may be coupled to the processor 1100. The processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the embodiments, it is possible to enter a rest mode when it is detected that the driver of a commercial vehicle is in an inattentive driving state, in which a driving control is performed such that the commercial vehicle automatically enters a next rest area when the commercial vehicle reaches a location of the next rest area, thereby preventing a safety accident in advance.

In addition, it is possible to monitor a road condition in real time and adjust the alarm time according to the road condition when the alarm schedule is registered in the server, in response to a driver request, when the vehicle is in an ignition-off state and when the vehicle is in the state of entering a rest mode, so that the convenience of the driver may be improved.

In addition, it is possible to create a pleasant rest environment by regulating the room, indoor, interior, or cab temperature based on the external temperature when the vehicle is in rest mode, thereby improving the satisfaction of the driver.

Hereinabove, although the present disclosure has been described with reference to various embodiments and the accompanying drawings, the present disclosure is not limited thereto, but may be variously modified and altered by those of ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims. All the technical ideas within the scope equivalent to the claims should be included in the scope of the present disclosure.

What is claimed is:

1. An apparatus for controlling driving of a vehicle, the apparatus comprising:
    a determination device configured to determine whether a driver is in an inattentive driving state during driving; and
    a controller configured to switch a driving mode of the vehicle into a rest mode when the driver is determined to be in the inattentive driving state and to control the vehicle to enter a rest area when the vehicle reaches the rest area on a traveling path of the vehicle,
    wherein the controller is configured to output a warning message to induce safety driving before reaching a specified distance from the rest area on the traveling path of the vehicle when the driving mode of the vehicle is switched to the rest mode.

2. The apparatus of claim 1, wherein the determination device is configured to collect driving state information of the vehicle during the driving and determine the inattentive driving state based on the collected driving state information.

3. The apparatus of claim 2, wherein the driving state information includes at least one of a brake pedal depressed state, a lane tracking state, a lane changing state, a lane departure state, and a steering state of the vehicle.

4. The apparatus of claim 1, wherein the controller is configured to output a guide message to induce the vehicle to enter the rest area when the driving mode of the vehicle is switched to the rest mode and the vehicle reaches a specified distance from the rest area on the traveling path of the vehicle.

5. The apparatus of claim 4, wherein the controller is configured to limit a driving speed and a lane change of the vehicle while the vehicle is induced to enter the rest area.

6. The apparatus of claim 1, wherein the controller is configured to output a control signal corresponding to an external temperature to control an interior temperature of the vehicle when the vehicle enters the rest area and is parked.

7. The apparatus of claim 1, wherein the controller is configured to access a server connected in wireless communication to register alarm information and switch to a standby mode when the alarm information is input from the driver in a state where the vehicle enters the rest area and parking is completed.

8. The apparatus of claim 7, wherein the controller is configured to release the standby mode and output an alarm signal when receiving an event signal from the server.

9. The apparatus of claim 8, wherein the controller is configured to output a first alarm signal when receiving the event signal from the server and output a second alarm signal when the rest mode is not released after a specified time has elapsed.

10. The apparatus of claim 9, further comprising:
    an alarm device configured to output an alarm sound corresponding to the first alarm signal and a warning sound corresponding to the second alarm signal.

11. The apparatus of claim 8, further comprising:
    an indoor lamp configured to be turned on in response to the alarm signal.

12. A method of controlling driving of a vehicle, the method comprising:
    determining whether a driver is in an inattentive driving state during driving;
    switching a driving mode of the vehicle into a rest mode when the driver is determined to be in the inattentive driving state;
    controlling the vehicle to enter a rest area when the vehicle reaches the rest area on a traveling path; and
    outputting a warning message to induce safety driving before reaching a specified distance from the rest area on the traveling path of the vehicle when the driving mode of the vehicle is switched to the rest mode.

13. The method of claim 12, further comprising:
    outputting a guide message to induce the vehicle to enter the rest area when the driving mode of the vehicle is switched to the rest mode and the vehicle reaches a specified distance from the rest area on the traveling path of the vehicle.

14. The method of claim 13, further comprising:
    limiting a driving speed and a lane change of the vehicle while the vehicle is induced to enter the rest area.

15. The method of claim 12, further comprising:
    outputting a control signal corresponding to an external temperature to control an indoor temperature of the vehicle when the vehicle enters the rest area and completes parking.

16. The method of claim 12, further comprising:
    accessing a server connected in wireless communication to register alarm information and switching to a standby mode when an alarm information is input from the driver in a state where the vehicle enters the rest area and parking is completed; and
    releasing the standby mode and outputting an alarm signal when an event signal is received from the server.

17. A vehicle system comprising:
    a driving control apparatus configured to switch a driving mode of a vehicle into a rest mode when the driving control apparatus determines that a driver is in an inattentive driving state during driving and to control the vehicle to enter a rest area when the vehicle reaches the rest area on a traveling path of the vehicle; and
    a server configured to register alarm information when receiving the alarm information from the driving control apparatus in a state where the vehicle enters the rest area and parking is completed, and to transmit an event signal to the driving control apparatus to inform a rest mode termination situation when a registered alarm time has elapsed.

18. The vehicle system of claim 17, wherein the server is configured to monitor a road condition in real time and adjust the registered alarm time based on the road condition.

19. The vehicle system of claim 18, wherein the server is configured to transmit the event signal to the driving control apparatus when the adjusted alarm time has elapsed.

\* \* \* \* \*